United States Patent [19]

Suzuki et al.

[11] Patent Number: 4,630,583
[45] Date of Patent: * Dec. 23, 1986

[54] SPARK IGNITION TIMING CONTROL SYSTEM FOR AN INTERNAL COMBUSTION ENGINE WITH RETARDING MEANS RESPONSIVE TO TRANSMISSION GEAR SHIFTING

[75] Inventors: Mikio Suzuki, Zushi; Masafumi Yamazaki, Yokohama, both of Japan

[73] Assignee: Nissan Motor Company, Limited, Yokohama City, Japan

[*] Notice: The portion of the term of this patent subsequent to Sep. 23, 2001 has been disclaimed.

[21] Appl. No.: 327,570

[22] Filed: Dec. 4, 1981

[30] Foreign Application Priority Data

Dec. 4, 1980 [JP] Japan .................................. 55-171325

[51] Int. Cl.⁴ .............................................. F02P 5/14
[52] U.S. Cl. .................................... 123/425; 123/418; 123/421; 74/860
[58] Field of Search .................. 123/425, 418; 74/850, 74/860, 872

[56] References Cited

U.S. PATENT DOCUMENTS

| | | | |
|---|---|---|---|
| 3,792,630 | 2/1974 | Hause | 74/860 |
| 3,898,894 | 8/1975 | Aono et al. | 123/421 |
| 3,901,201 | 8/1975 | Mizuguchi et al. | 123/424 |
| 4,048,966 | 9/1977 | Harada et al. | 74/860 |
| 4,114,574 | 9/1978 | Platzer, Jr. | 123/418 |
| 4,328,779 | 11/1979 | Hattori et al. | 123/425 |
| 4,347,819 | 9/1982 | Roberts | 123/418 |
| 4,364,353 | 12/1982 | Fiala | 123/425 |

*Primary Examiner*—Parshotam S. Lall
*Attorney, Agent, or Firm*—Schwartz, Jeffery, Schwaab, Mack, Blumenthal & Koch

[57] ABSTRACT

A spark ignition timing control system for an automotive vehicle internal combustion engine utilizes a first sensor for detecting engine speed, a second sensor for detecting engine knocking and a third sensor for detecting transmission upshifting. The control system operates in response to the first, second and third signals to retard the spark advance angle to reduce knocking due to change in engine speed upon engine upshift.

16 Claims, 20 Drawing Figures

INPUT SECTION 110

SMOOTHING SECTION 130

COMPARATOR SECTION 150

DETECTOR SECTION 170

SPARK ADVANCER 430

V/C CONVERTER 436

SPARK IGNITION TIMING CONTROL SYSTEM FOR AN INTERNAL COMBUSTION ENGINE WITH RETARDING MEANS RESPONSIVE TO TRANSMISSION GEAR SHIFTING

BACKGROUND OF THE INVENTION

The present invention relates generally to a spark ignition timing control system for a spark ignition internal combustion engine for controlling spark advance corresponding to the engine operating condition. More specifically, the invention relates to a spark ignition timing control system for controlling spark advance in response to an engine knock sensor signal and transmission gear shifting.

Spark ignition internal combustion engines in automotive vehicle use a basic spark timing setting which is advanced with manifold vacuum and engine speed in accordance with a predetermined spark timing schedule. The basic setting, the speed advance, and the amount of vacuum advance, are selected to provide spark timing sufficiently retarded from the timing that creates objectionable engine knock. In establishing the basic setting and the advance characteristics, account is taken of the variations of knocking quality of the fuels likely to be used, the various engine operating conditions likely to be encountered, likely engine deterioration, and other factors that may require greater ignition retard to avoid engine knock. It has not been possible for the conventional spark advance controls to provide the more efficient and responsive engine operation and other advantages that could be obtained if engine knock at undesirable levels was precluded.

With regard to the more effective spark advance controls capable of application to spark ignition internal combustion engines to preclude operation at undesirable levels of engine knock, one approach had been made, which was described in U.S. Pat. No. 4,002,155 to John L. Harned et al, issued on Jan. 11, 1977. Harned et al shows an engine and engine spark timing control with a knock limiting circuit which includes a knock detector for sensing engine knock and a digital programmed spark timing controller. The knock detector produces a detector signal. The number of individual ringing vibrations exceeding a reference signal during a predetermined amount of engine crankshaft rotation is counted. When the number of such counts exceeds a predetermined crankshaft rotation, engine spark timing is retarded. If the number of such counts is less than a predetermined number during the predetermined crankshaft rotation, engine spark is advanced.

In such control systems, feedback control lags due to a lag of response in the system. Although such lag of response may be ignored in the normal and stable driving condition, this lag will possibly cause engine knocking upon shifting-up the transmission gear, particularly in the relatively high or full load condition. Namely, when an automatic transmission shifts up from second gear to top gear or from top gear to over-drive gear, the engine speed is abruptly dropped to the areas possibly causing engine knocking. Therefore, a spark timing control is required which can follow abrupt acceleration or deceleration of the engine and can retard spark timing in response to upshifting of the automatic transmission gear.

SUMMARY OF THE INVENTION

Therefore, it is an object of the present invention to provide a spark ignition timing control system which is responsive to upshifting of the transmission gear to retard the spark advance in order to prevent the engine from knocking due to an abrupt drop of the engine speed.

Another object of the invention is to provide a spark ignition timing control which includes means for detecting the engine operating condition in which the transmission gear shifting-up occurs.

To accomplish the above-mentioned and other objects, there is provided a spark ignition timing control, according to the present invention, in which is included means for detecting the automatic transmission gear shifting up. The upshifting detecting means produces a signal indicative of a predetermined retard angle of spark advance in order to retard the spark advance for a given period of time immediately after the transmission gear shifts up.

In the preferred construction, the spark advance is not retarded even when the transmission gear is shifted up, while the engine is in a cold engine condition. This is intended to avoid degrading drivability caused by retarding spark advance and possible knocking in a cold engine.

A further object of the invention is to provide a method for preventing knock in the engine, which otherwise may occur, which method includes detection of the automatic transmission gear shifting and retarding spark advance at a given angle and for a given period of time immediate after the gear is shifted up.

The object is accomplished by a method provided by the present invention, in which an engine operating condition in a vehicle wherein the automatic transmission gear shifting is detected by an intake vacuum sensor, a throttle angle sensor and/or engine speed sensor etc. The retarding angle and duration of the retarded spark advance responsive to gear shifting-up is selected so that it can prevent the engine from causing knock and from degrading drivability.

BRIEF DESCRIPTION OF THE DRAWINGS

The present invention will become more fully understood from detailed description given herebelow and from the accompanying drawings. The specific embodiment illustrated on the drawings and described is not to be understood as limitative of the invention but only for the purpose of explanation.

In the drawings.

DESCRIPTION OF THE PREFERRED EMBODIMENT

Figure 1:
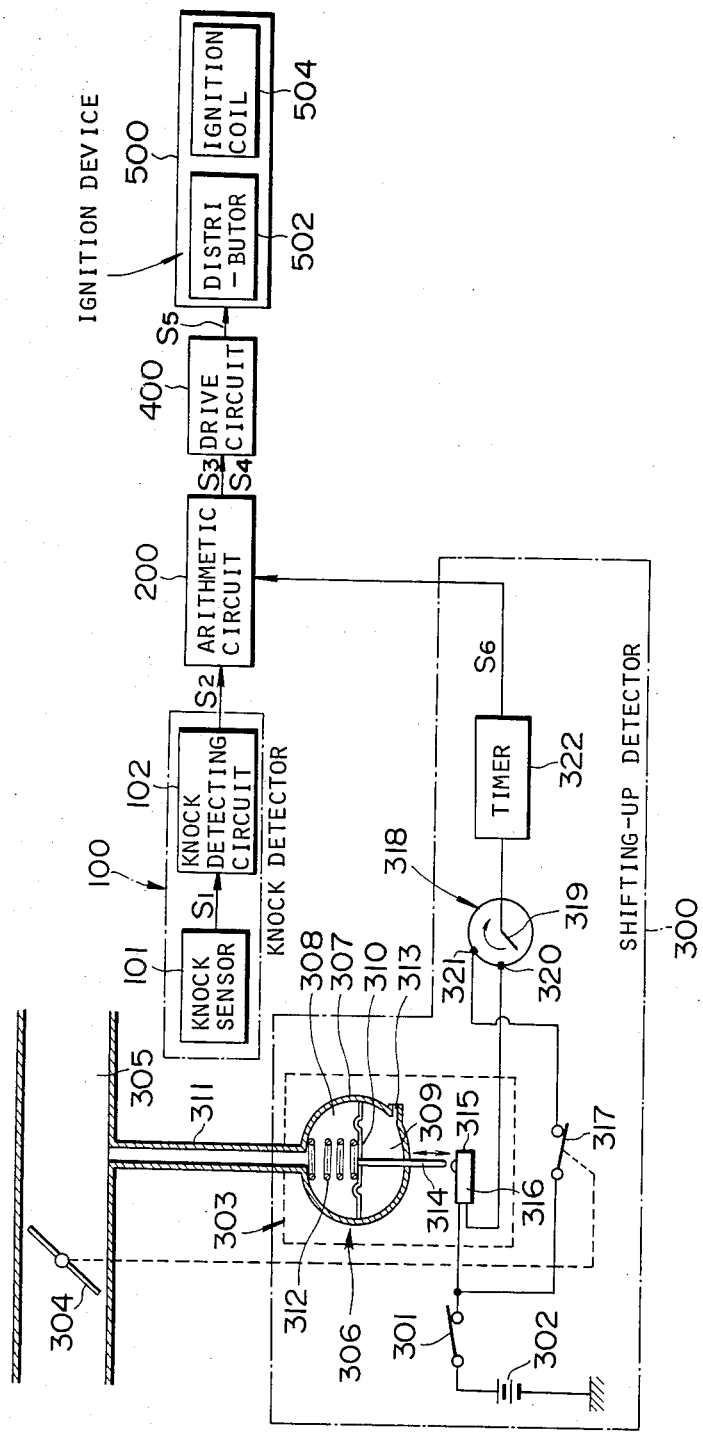
FIG. 1 is a schematic diagram of a preferred embodiment of a spark ignition timing control system according to the present invention.

Now, referring to the preferred embodiment of a spark ignition timing control system of the present invention, which is illustrated generally in FIG. 1, the system comprises a knock detector 100, an arithmetic circuit 200, a shifting-up detector 300, a drive circuit 400 and an ignition device 500 including a distributor 502 and an ignition coil 504. The knock detector 100 is associated with a knock sensor 101.

Incorporation is made by reference of U.S. Pat. No. 4,002,155 with respect to the knock detector 100 inclusive of the knock sensor 101. A vibration sensor for detecting the magnitude of engine vibration and producing a sensor signal having a value proportional to the detected engine vibration magnitude, can be used as the knock sensor 101. Vibration sensors for detecting engine vibrations are per se well known and an appropriate one may be selected for use in the present spark ignition timing control system. Also, other suitable sensors can be used for detecting knock on in the engine. The sensor signal $S_1$ indicative of detected magnitude of engine knocking is fed to a knock detecting circuit 102.

The knock detecting circuit 102 together with the knock sensor 101 constitutes the knock detector 100. The knock detecting circuit 102 detects a specific frequency range of the sensor signal $S_1$ which is representative of engine knocking and has a signal value proportional to the magnitude of engine knocking. The specific frequency range of the sensor signal $S_1$ showing the engine knocking condition is defined depending on each individual engine and may be preset in the knock detecting circuit 102. When the specific frequency range of sensor signal $S_1$ is detected, the knock detecting circuit 102 produces a knocking pulse signal $S_2$ having a frequency proportional to the amplitude of the sensor signal $S_1$, and thus, which is representative of the magnitude of engine knocking.

The arithmetic circuit 200 is responsive to the knocking pulse signal $S_2$ fed from the knock detecting circuit 102 to produce a low level output $S_3$. The low level output $S_3$ of the arithmetic circuit 200 decreases at a predetermined rate. The arithmetic circuit 200 otherwise, produces an output $S_4$ increasing at a predetermined rate. Here, the increasing rate of the arithmetic circuit output $S_4$ is higher than the decreasing rate of the low level output $S_3$. The arithmetic circuit outputs $S_3$ and $S_4$ are fed to drive circuit 400.

The drive circuit 400 is responsive to the arithmetic circuit outputs $S_3$ and $S_4$ to advance or retard the spark advance in order to control spark timing to maintain the engine in a trace or light knocking condition. The drive circuit 400 produces a control signal $S_5$ which causes an advance or retardation of the angle of spark advance depending on the arithmetic circuit outputs $S_3$ and $S_4$. In practice, the drive circuit 400 produces control signal $S_5$ to retard spark advance in response to the low level output $S_3$ and otherwise, to advance the spark advance. The control signal $S_5$ is fed to the distributor 502 associated with the ignition device 500. The ignition device 500 controls charge timing to the ignition coil 504 to control spark ignition timing.

According to the present invention, the shifting-up detector 300 is provided in the above-illustrated closed loop control circuit for feedback controlling spark ignition timing. The shifting-up detector 300 detects an abrupt drop of engine speed due to the shifting-up of the automatic transmission gear position, for example from second gear to third gear or from third gear to fourth gear, and produces a shift-up signal $S_6$ for a predetermined period of time. The shift-up signal $S_6$ is fed to the arithmetic circuit 200. The arithmetic circuit 200 is responsive to the shift-up signal $S_6$ to produce the low level output $S_3$ for a duration substantially corresponding to the period of time the shift-up signal $S_6$ is inputted.

For detecting the gear shift-up in an automatic transmission, engine or engine coolant temperature, intake vacuum pressure, throttle valve angle position and engine speed are detected. When (1) the engine is not in a cold engine condition, (2) the absolute intake vacuum pressure drops to a predetermined value or the throttle valve is in the full-throttle position, and (3) engine speed is above a predetermined value, the shifting-up detector 300 produces the shift-up signal $S_6$. A engine or engine coolant temperature switch 301 (hereinafter more generally termed an engine temperature switch) is mounted to the engine cylinder block (not shown) to detect the engine or engine coolant temperature and is connected to a vehicle battery 302 in series. The engine temperature switch 301 turns off (opens) while the engine temperature is maintained below a predetermined temperature, for example 40° C. An intake vacuum switch 303 is connected in series to the engine temperature switch 301 and turns on (closes) while the absolute vacuum flowing downstream of a throttle valve 304 in an air intake passage 305 is below a predetermined value, for example, 100 mmHg.

In the preferred embodiment, a diaphragm switch 306 is used for the intake vacuum switch 303. The diaphragm switch 306 comprises a diaphragm housing 307 defining therein two chambers 308 and 309 separated by a diaphragm 310. The chamber 308 is connected to the air intake passage 305 downstream of the throttle valve 304 via a vacuum passage 311. A set spring 312 is disposed within the chamber 308 for providing a set pressure urging the diaphragm 310 toward the chamber 309 at a given pressure. The chamber 309 is opened to the ambient air via an inlet 313. A stem-like movable member 314 is fixed to the diaphragm 310 at one end thereof and extends through the chamber 309. The free end of the movable member 314 opposes a projecting contact switch member 315 of a vacuum switch 316 which is connected with the vehicle battery 302 via the engine or engine coolant temperature switch 301 in series.

A full-throttle switch 317 is connected to the throttle valve 304 via a per se well known mechanical linkage in order to turn on when the throttle valve 304 is placed in an angle position exceeding a predetermined open angle. The full-throttle switch is connected in series to the vehicle battery 302 via the engine temperature switch 301 and in parallel to the vacuum switch 316. An engine speed switch 318 comprises a movable switch member 319 adapted to vary the position thereof depending on the engine speed and a pair of stationary switch members 320 and 321 respectively connected with the vacuum switch 316 and the full-throttle switch 317. The stationary switch members 320 and 321 are located at positions where the movable switch member 319 comes into contact at respectively predetermined engine speeds, for example, 2,000 r.p.m. and 3,400 r.p.m. The predetermined engine speeds are corresponded to shifting-up points for shifting-up the automatic transmission gear under partial and full load conditions. The shifting-up switch 318 is connected to a timer 322 which is turned on for a predetermined period of time in response to closing of the shifting-up switch 318. The timer 322 produces the shift-up signal $S_6$ when the switch 318 is closed on one of the contacts 320 or 321.

The further detailed circuit structure of the blocks illustrated in FIG. 1 will be described herebelow with reference to FIGS. 2 to 24 together with the function of the system as set forth.

Figure 2:
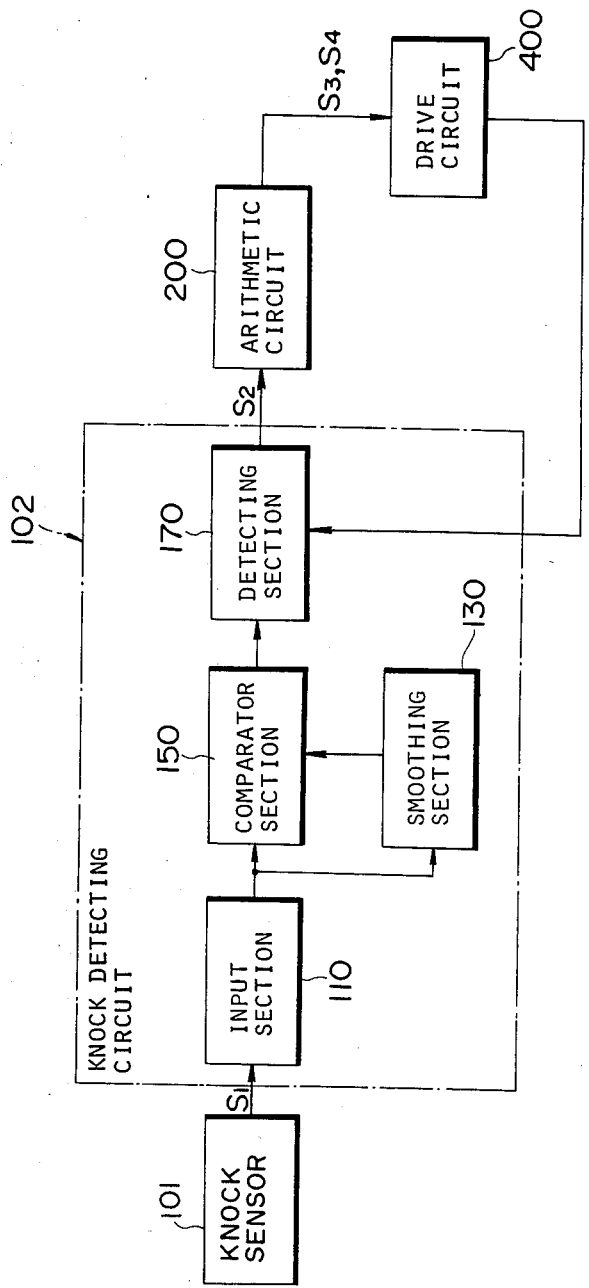
FIG. 2 is a block diagram of a knock detecting circuit in the control system of FIG. 1.

FIGS. 2 to 8 illustrate the detail of the knock detecting circuit 102. As shown in FIG. 2, the knock detecting circuit 102 comprises an input section 110, a smoothing section 130, a comparator section 150 and a detecting section 170. The input section 110 is connected to the knock sensor 101 in order to receive the sensor signal $S_1$. The input section 110 takes out background noise contained in the sensor signal $S_1$, amplifies the signal level and rectifies the signal.

Figure 3:
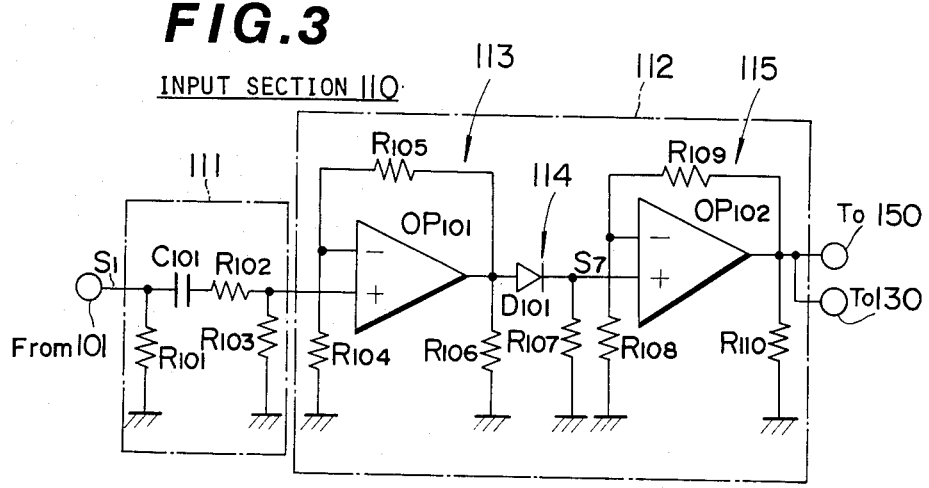
FIG. 3 is a circuit diagram showing detailed circuit structure of an input section in the knock detecting circuit of FIG. 2.
Figure 6:
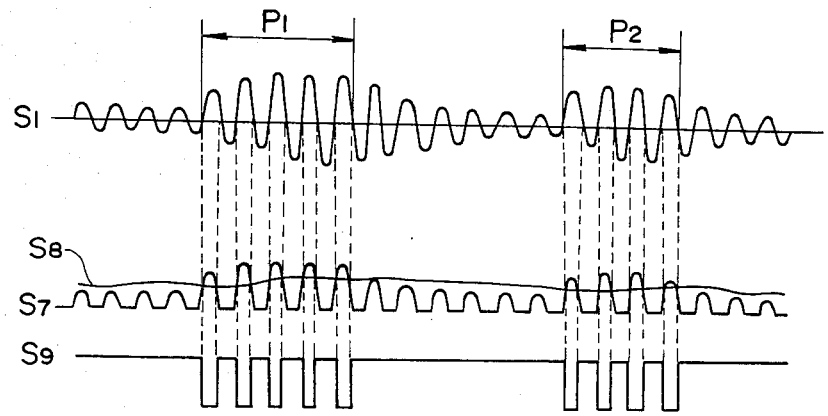
FIG. 6 is a time chart illustrating functions of the smoothing section and comparator section and waveforms of the outputs thereof.

It should be noted, although the description herebelow is given for the input section for half-wave rectification, it is possible to use a circuit which can effect full-wave rectification. Also, it is possible to use a band-pass filter for picking up the specific frequency range of the sensor signal which is indicative of engine knocking. As shown in FIG. 3, the input section 110 has a filter 111 comprising resistors $R_{101}$, $R_{102}$, $R_{103}$ and a capacitor $C_{101}$. The filter 111 takes out the background noise in the sensor signal $S_1$. The resistor $R_{102}$ of the filter 111 is connected to a positive input of an operational amplifier $OP_{101}$ of a half-wave rectifier 112. The operational amplifier $OP_{101}$ consists of an amplifier circuit 113 together with resistors $R_{104}$, $R_{105}$ and $R_{106}$. The amplifier circuit 113 is connected with a half-wave rectifier circuit 114 constituted by a diode $D_{101}$ and a resistor $R_{107}$. The amplifier circuit 113 amplifies the sensor signal passed through the filter 111 at a predetermined value. The half-wave rectifier circuit 114 rectifies the amplified sensor signal to take out any negative component in the signal and to produce a rectifier output $S_7$, as shown in FIG. 6. The rectifier output $S_7$ is again amplified in an amplifier circuit 115 which comprises an operational amplifier $OP_{102}$ and resistors $R_{108}$, $R_{109}$ and $R_{110}$.

Here, since the knock sensor 101 has a resonating frequency corresponding to possible engine knocking vibration, the sensor signal $S_1$ level becomes higher when engine knock occurs. In FIG. 6, there is shown an example wherein engine knock occurs at the periods $P_1$ and $P_2$.

Figure 4:
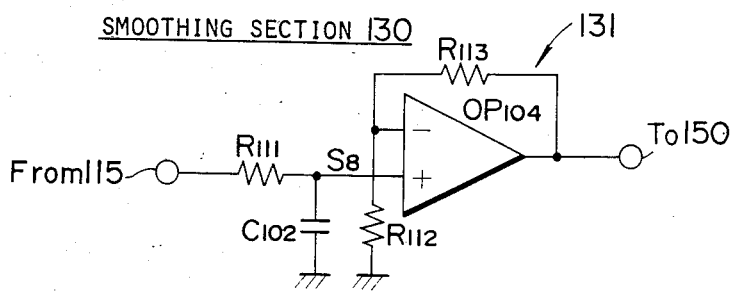
FIG. 4 is a circuit diagram showing detailed circuit structure of a smoothing section in the knock detecting circuit of FIG. 2.
Figure 5:
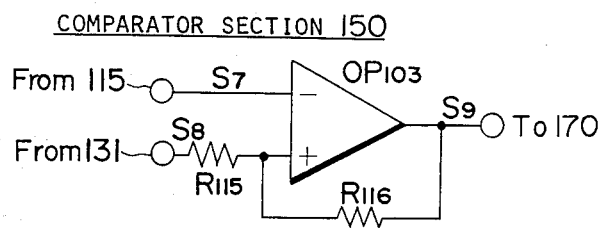
FIG. 5 is a circuit diagram showing detailed circuit structure of a comparator section in the knock detecting circuit of FIG. 2.

The rectifier output $S_7$ amplified through the amplifier circuit 115 is fed to a negative input of an operational amplifier $OP_{103}$ of the comparator section 150. Also, input section 110 is connected to the positive input of the operational amplifier $OP_{103}$ via the smoothing section 130. As shown in FIG. 4 the smoothing section 130 comprises a resistor $R_{111}$ and a capacitor $C_{102}$ for smoothing the rectified output $S_7$ as represented by $S_8$ in FIG. 6. The smoothed signal $S_8$ is amplified by an amplifier circuit 131 which comprises an operational amplifier $OP_{104}$ and resistors $R_{112}$ and $R_{113}$. The comparator section 150 includes the operational amplifier $OP_{103}$ and resistors $R_{115}$ and $R_{116}$. The resistor $R_{115}$ is interposed between the smoothing section 130 and the positive input of the operational amplifier $OP_{103}$. The operational amplifier $OP_{103}$ produces pulse signal $S_9$ which is normally maintained at a high level and, when the value of rectified output $S_7$ becomes greater than that of the smoothed signal $S_8$, is lowered from a period of time while the output $S_7$ is above the signal $S_8$, as shown in FIG. 6.

Figure 8:
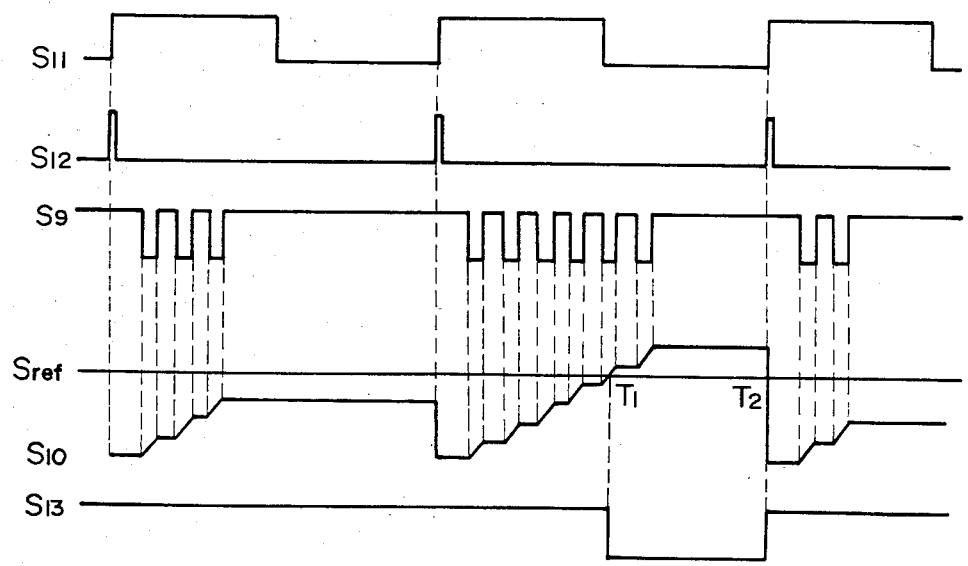
FIG. 8 is a time chart illustrating functions of the detecting section of FIG. 7.
Figure 7:
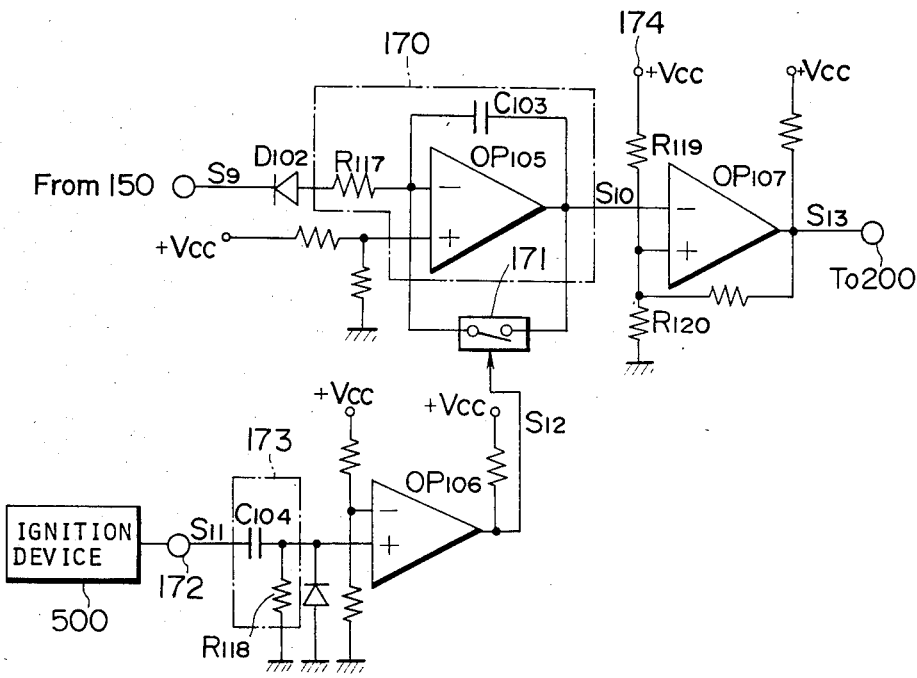
FIG. 7 is a circuit diagram showing detailed circuit structure of a detecting section in the knock detecting circuit of FIG. 2.

In FIG. 7, the detector section 170 receives the pulse signal $S_9$ fed from the comparator section 150. The pulse signal $S_9$ is inputted through a diode $D_{102}$ to a negative terminal of an operational amplifier $OP_{105}$ of an integrating circuit 170 via a resistor $R_{117}$. The operational amplifier $OP_{105}$ and the resistor $R_{117}$ constitute the integrating circuit with a capacitor $C_{103}$. The positive terminal of the operational amplifier $OP_{106}$ is supplied with a fixed potential level. The integrating circuit 170 further includes a relay switch 171. If the relay switch 171 is open, the negative-going component of the above pulse signal $S_9$ is integrated with respect to time. The integrating circuit 170 produces integrator output $S_{10}$ having a step-like waveform as shown in FIG. 8. On the other hand, a spark command signal $S_{11}$ is fed back from the ignition device 500 to an input terminal 172. The spark command signal $S_{11}$ is differentiated in a differentiator 173 consisting of a capacitor $C_{104}$ and a resistor $R_{118}$ with respect to time, and is amplified in an operational amplifier $OP_{106}$. Thus, the differentiated signal $S_{12}$ having a positive-going component of a fixed width each time the spark command signal $S_{11}$ is produced, is produced in the differentiator 173, as shown in FIG. 8. The relay switch 171 is responsive to the positive-going component to close, i.e. each time spark ignition is effected the capacitor $C_{103}$ is short-circuited to reset the integrator. Therefore, the integrator output $S_{10}$ instantaneously returns to a predetermined level, as shown in FIG. 8. The integrator output $S_{10}$ is inputted to a negative input terminal of an operational amplifier $OP_{107}$. The operational amplifier $OP_{107}$ compares the integrator output value with the value of a reference signal $S_{ref}$ supplied to a positive input terminal of the comparator $OP_{107}$ from a power source 174. The reference signal $S_{ref}$ has a constant voltage level obtained by dividing resistors $R_{119}$ and $R_{120}$. The operational amplifier $OP_{107}$ outputs a comparator signal $S_{13}$ of relatively low level when the integrator output $S_{10}$ exceeds the reference signal $S_{ref}$, i.e. during the time $T_1$ to $T_2$ in FIG. 8. Thus low level comparator signal $S_{13}$ is indicative of the engine knocking condition and serves as knocking pulse signal $S_2$.

In the particular embodiment, although the reference signal $S_{ref}$ is shown as being at a constant level, it may be embodied otherwise so as to meet the driving condition of the engine if the resistors $R_{119}$ and $R_{120}$ are variable depending on the engine driving condition.

Figure 9:
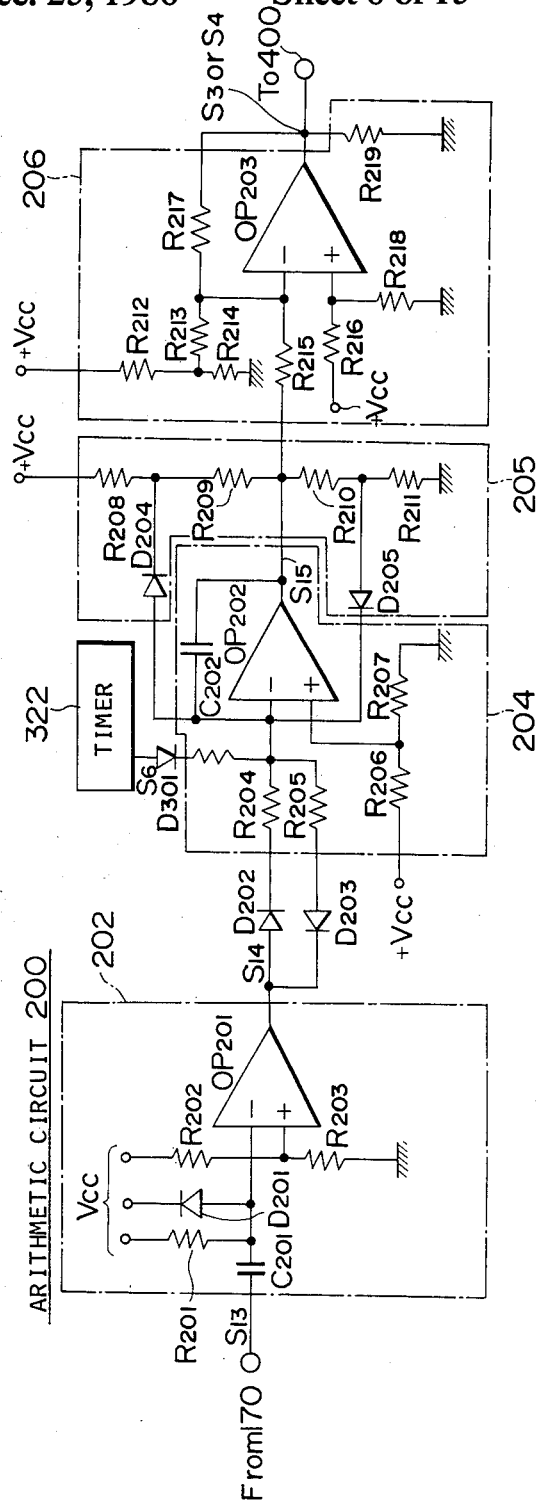
FIG. 9 is a circuit diagram of an arithmetic circuit of FIG. 1.
Figure 16:
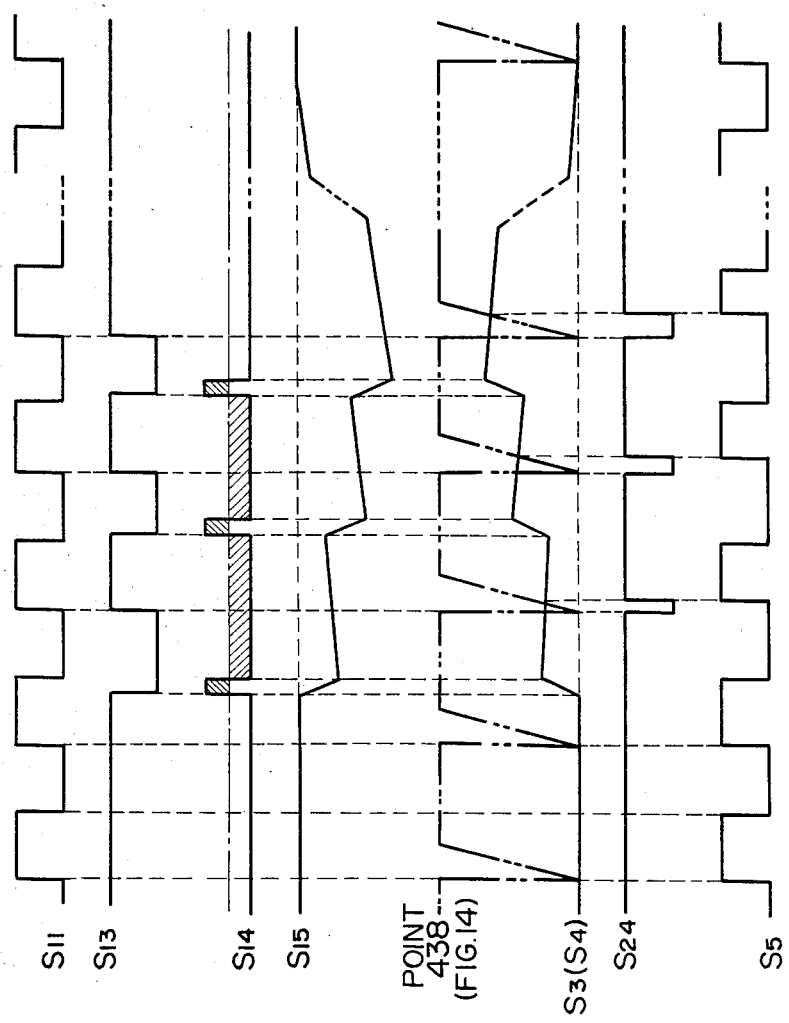
FIG. 16 is a time chart showing functions of the advance control section of FIG. 14.

As shown in FIG. 9, the arithmetic circuit 200 includes a monostable-multivibrator 202 including an operational amplifier $OP_{201}$, a capacitor $C_{201}$, resistors $R_{201}$ to $R_{203}$, and a diode $D_{201}$, at its forward stage. The monostable-multivibrator 202 is triggered when the comparator output $S_{13}$ changes from high level to low level to output a trigger signal $S_{14}$, as shown in FIG. 16. The monostable-multivibrator 202 is connected to an integrator 204 via diodes $D_{202}$ and $D_{203}$. The integrator 204 is constituted by an amplifier $OP_{202}$, a capacitor $C_{202}$, and resistors $R_{204}$ to $R_{207}$. The integrator 204 is connected through two diodes $D_{202}$ and $D_{203}$, which are disposed with opposing polarities, to the operational amplifier $OP_{201}$. Thus the integrator 204 can be set with time constants for two integrating directions independently of each other. Namely, the downward time constant is determined by the resistor $R_{204}$ and the capacitor $C_{202}$, whereas the upward time constant is determined by the resistor $R_{205}$ and the capacitor $C_{202}$. A limiting circuit 205 consists of diodes $D_{204}$ and $D_{205}$, and resistors $R_{208}$ to $R_{211}$, and limits the operational range of the integrator 204 between 0 and $+V_{cc}$ of a power supply. Thus when the above-mentioned trigger signal $S_{14}$ is applied to the integrator 204, the integrator output $S_{15}$ varies in value according to the frequency and signal value of the trigger signal $S_{14}$, as shown in FIG. 16. The integrator output $S_{15}$ rises gradually so long as the trigger signal $S_{14}$ is at a relatively low level, which is limited at an upper value determined by resistors $R_{210}$ and $R_{211}$, and which rapidly falls when the trigger signal $S_{14}$ goes high. As will be clear from FIG. 16, if the respective time constants are selected so that the rising speed is less than the falling speed, and if high levels of the trigger signal $S_{14}$ occur very frequently, the integrator output $S_{15}$ will fall stepwise and is limited to a lower level defined by dividing resistors $R_{208}$ and $R_{209}$.

The time interval for which the trigger signal $S_{14}$ stays high is a fixed time duration determined by the monostable multivibrator 202 including the amplifier $OP_{201}$. The integrated value in the integrator 204 in the downward direction for this high level trigger signal $S_{14}$ is constant. This constant value is preferably selected so as to correspond to a 0.5° spark retard angle. Since the magnitude of the integrator output $S_{15}$ corresponds to the frequency of occurrence of high levels of the trigger $S_{14}$, it can be used as an adjustment value for the spark timing.

The integrator 204 is connected to a polarity inversion circuit 206 consisting of resistors $R_{212}$ to $R_{219}$ and an operational amplifier $OP_{203}$. This circuit inverts the polarity of the incoming integrator output $S_{15}$ in order to match the same to the signal of the equal advance angle control section of the drive circuit 400, adjusts the level of the integrator output $S_{15}$ and outputs an inverter output which inverter output serves as the arithmetic circuit output $S_3$ or $S_4$ shown in FIG. 16.

To the integrator 204 of the arithmetic circuit 200, the timer 322 of the shifting up detector 300 for detecting transmission gear shifting up is connected through a diode $D_{301}$. As shown in FIG. 1, the engine temperature switch 301 is turned on (closed) when the detected temperature is above the predetermined temperature. At an engine driving condition where the automatic transmission gear position shifts up the, e.g., from second gear to top gear or from top gear to over-drive gear, the absolute pressure of the intake vacuum and the engine speed reach their respective threshold values. In the preferred embodiment, the automatic transmission shifting up point is set 2,000 r.p.m. of engine speed under $-100$ mmHg of partial load condition and 3,400 r.p.m. of engine speed under full load condition. Therefore, the intake vacuum switch 303 of the preferred embodiment is adapted to turn on (close) when detected vacuum pressure in the air intake passage 305 downstream of the throttle valve 304 is above $-100$ mmHg. The set pressure of the set spring 312 of the diaphragm switch 306 is adjusted so that the diaphragm 310 is deformed toward the vacuum switch 316 to push the switch member 315 with the movable member 317 when the intake vacuum pressure greater than $-100$ mmHg is detected. The vacuum switch 316 is connected to the stationary switch member 320 of the engine speed switch 318. The stationary switch member 320 is adapted to contact with the movable switch member 319 when the detected engine speed is 2,000 r.p.m. Therefore, when the intake vacuum is greater than $-100$ mmHg and the engine speed is increased to 2,000 r.p.m., the power from the vehicle battery 302 is applied to the timer 322.

On the other hand, a full load condition on the engine is detected by the full-throttle switch 317. The full-throttle switch 317 is connected to the throttle valve 304 with a suitable link mechanism so that it may turn on when the throttle valve 304 is fully open. The full-throttle switch 317 is connected to the stationary switch member 321 of the engine speed switch 318. The movable switch member 319 contacts with the stationary switch member 321 when the engine speed is increased to 3,400 r.p.m. Therefore, the battery power is also applied to the timer 322 when the throttle valve 304 is fully opened and the engine speed reaches 3,400 r.p.m.

Figure 10:
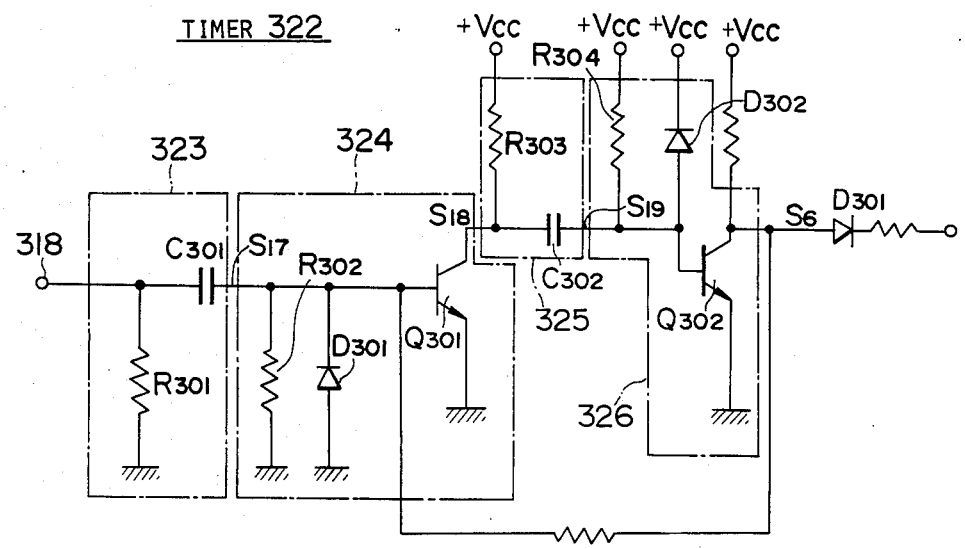
FIG. 10 is a circuit diagram showing detail of the timer circuit in the shifting-up detector of FIG. 1.
Figure 11:
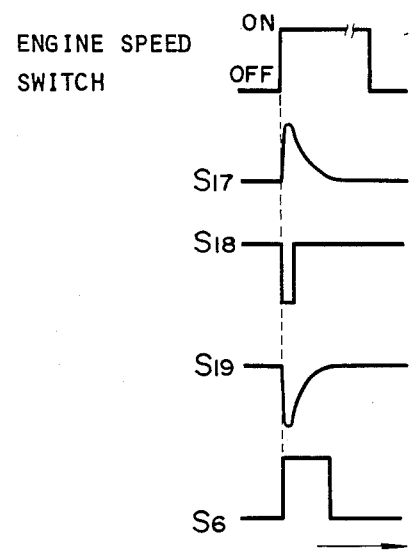
FIG. 11 is a time chart illustrating the function of the timer of FIG. 10.

Referring to FIG. 10, there is shown a circuit structure of the timer 322. The timer 322 comprises a first differentiator 323, a first inverter 324, a second differentiator 325 and a second inverter 326. The first differentiator 323 includes a resistor $R_{301}$ and a capacitor $C_{301}$ and differentiates the engine speed switch output to produce differentiator output $S_{17}$, as shown in FIG. 11. The first inverter 324 receives the differentiator output $S_{17}$, which inverter 324 comprises a resistor $R_{302}$, a diode $D_{301}$ and a transistor $Q_{301}$. The invertor 324 inverts and shapes the differentiator output $S_{17}$ to produce negative rectangular pulse $S_{18}$ in FIG. 11. The negative rectangular pulse $S_{18}$ is again differentiated through the second differentiator 325 which comprises a resistor $R_{303}$ and a capacitor $C_{302}$. A differentiator output $S_{19}$ is again inverted to a positive rectangular pulse serving as the shift-up signal $S_6$. The shift-up signal $S_6$ has a duration corresponding to a predetermined retard angle. The second inverter 326 thus includes a resistor $R_{304}$, a diode $D_{302}$ and a transistor $Q_{302}$ which is turned off in response to the differentiator output $S_{19}$ to produce the constant duration of shift-up signal $S_6$.

The shift-up signal $S_6$ is fed to the integrator 204 of the arithmetic circuit 200 via the diode $D_{301}$, as set forth. The shift-up signal $S_6$ is inputted to the negative input terminal of the operational amplifier $OP_{202}$. The integrator output $S_{15}$ representative of a predetermined retard angle is thus produced in a period of time corresponding to the duration of the shift-up signal $S_6$, instead of taking the trigger signal $S_{14}$ from the monostable multivibrator 202 into account.

Figure 12:
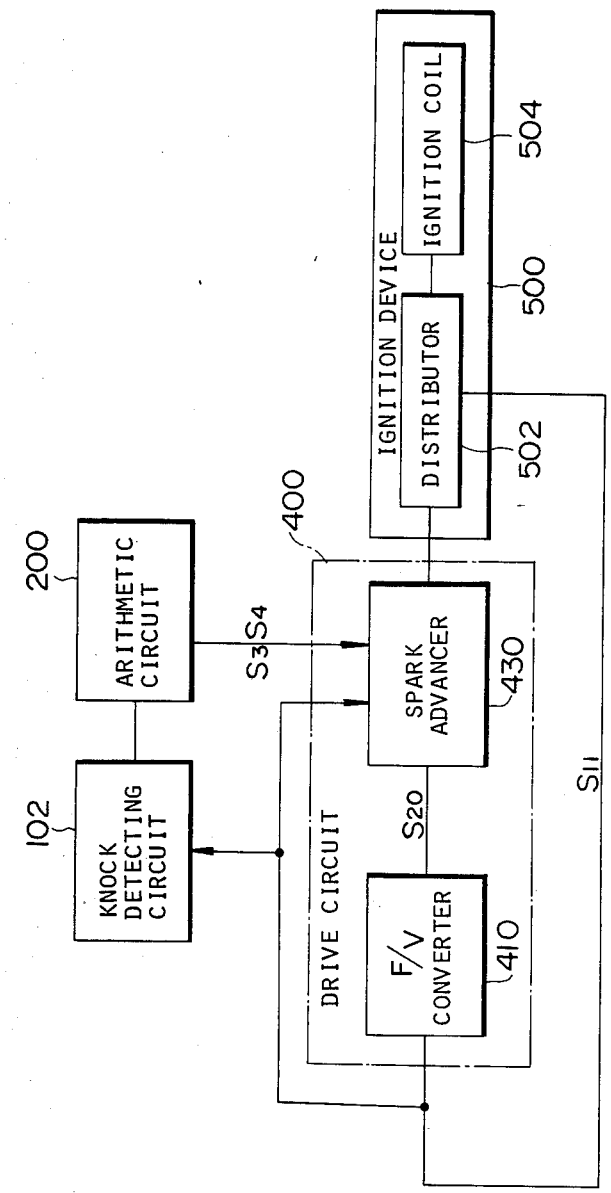
FIG. 12 is a block diagram of the drive circuit of FIG. 1.

The arithmetic circuit output $S_3$ or $S_4$ is fed to the drive circuit 400 which comprises a frequency/voltage convertor 410 and a spark advancer 430, as shown in FIG. 12. The arithmetic circuit output $S_3$ or $S_4$ is fed to the spark advancer 430 to advance or retard the spark advance angle. To the spark advancer 430, a feedback signal $S_{11}$ is fed from a ignition device 500 via the frequency/voltage converter 410.

Figure 13:
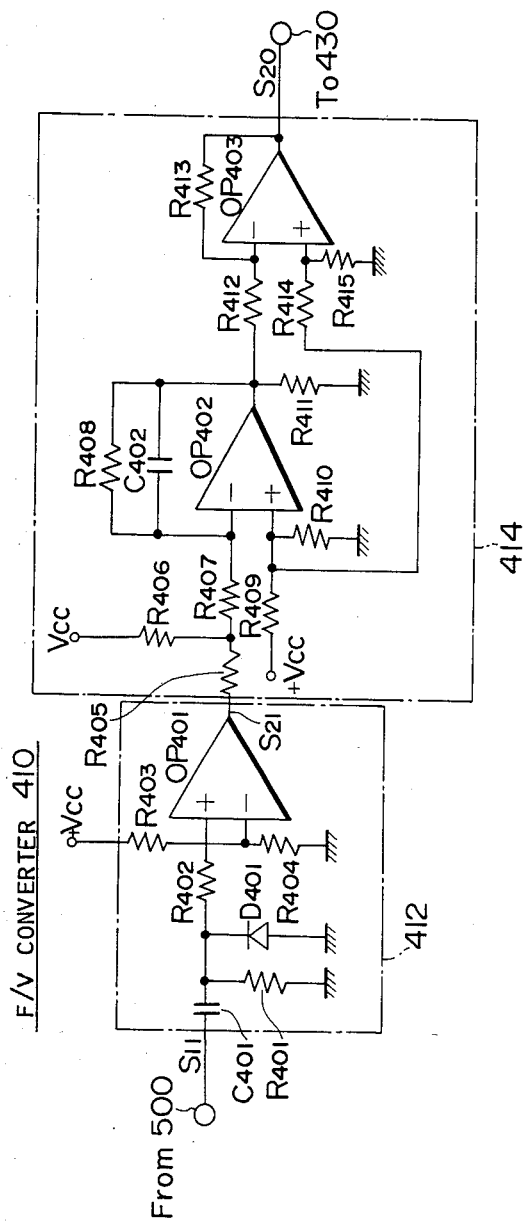
FIG. 13 is a circuit diagram illustrating detailed circuit structure of the frequency/voltage converter in the drive circuit of FIG. 12.

FIG. 13 shows a frequency/voltage converter 410 which produces an analog signal $S_{20}$ having a value proportional to the engine speed based on the frequency of occurrence of the feedback signal $S_{11}$. A monostable multivibrator 412, formed by a capacitor $C_{401}$, resistors $R_{401}$ to $R_{404}$, a diode $D_{401}$, and an operational amplifier $OP_{401}$, converts the spark command signal as feedback signal $S_{11}$ to a pulse signal $S_{21}$ having a constant duration. This pulse signal $S_{11}$ is converted to an analog signal $S_{20}$ having a value proportional to the frequency of the pulse signal by a smoothing circuit 414 consisting of resistors $R_{405}$ to $R_{415}$, a capacitor $C_{402}$ and operational amplifiers $OP_{402}$ and $OP_{403}$. The analog signal $S_{20}$ indicative of the engine speed and is fed to the spark advancer 430.

Figure 14:
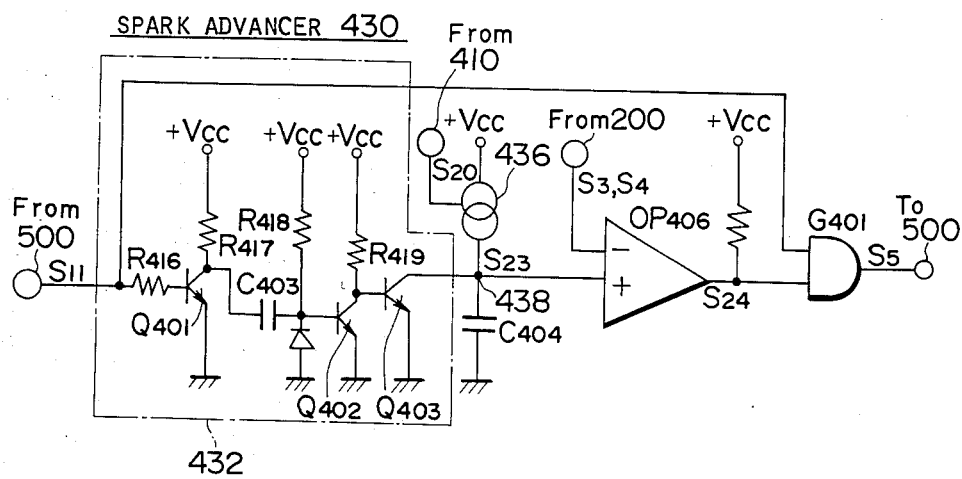
FIG. 14 is a circuit diagram illustrating detailed circuit structure of the advance control section in the drive circuit of FIG. 12.

As shown in FIG. 14, the spark advancer 430 includes a differentiating circuit 432 consisting of transistors $Q_{401}$ to $Q_{403}$, resistors $R_{416}$ to $R_{419}$, and a capacitor $C_{403}$. This differentiating circuit 432 is also connected to the ignition device 500 to receive the feedback signal $S_{11}$. The differentiating circuit 432 differentiates the feedback signal $S_{11}$ from the distributor 502 of the ignition device 500 with respect to time, renders the transistor $Q_{403}$ conductive at each rising edge of the feedback signal $S_{11}$, and short-circuits a capacitor $C_{404}$ for resetting purposes. In response to short-circuiting the capacitor $C_{404}$, the transistor $Q_{403}$ is rendered nonconductive. Then, the capacitor $S_{404}$ is charged with an electric current fed from a voltage/current converter 436. The voltage/current converter 436 receives the analog signal $S_{20}$ fed from the frequency/voltage converter 410. Thus, the value of the electric current $S_{23}$ is proportional to the engine speed. At this time, the potential at a terminal 438 varies as shown in FIG. 16.

Figure 15:
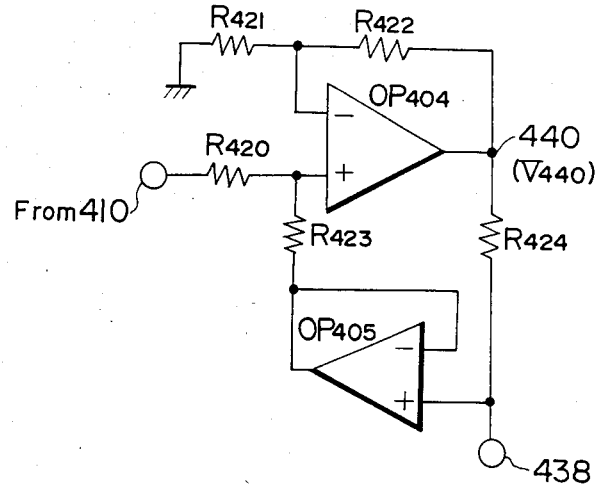
FIG. 15 is a circuit diagram of a voltage/current converter associated with the advance control section of FIG. 14.

The voltage/current converter 436 has the structure shown in FIG. 15 in which the analog signal $S_{20}$ proportional to engine speed is supplied through a resistor $R_{420}$ to a plus input terminal of a differential amplifier $OP_{404}$. Here assuming the potential at the output terminal 440 is $V_{440}$ and the resistors $R_{421}$ to $R_{424}$ being of the same resistance value, the potential applied to the positive input terminal of the differential amplifier $OP_{404}$ is $(S_{20}+V_{440})/2$, because of the feedback circuit including the differential amplifier $OP_{405}$ and resistor $R_{423}$, and the potential applied to the negative terminal of the differential amplifier $OP_{404}$ is half of the output value of the differential amplifier $OP_{404}$. The differential amplifier $OP_{404}$ operates such that the output thereof becomes $S_{20}+V_{440}$ under the presence of the feedback circuit. Thus the voltage across the resistor $R_{424}$ is $S_{20}(=S_{20}+V_{440}-V_{440})$. The electric current flowing through this resistor $R_{424}$, i.e. the output current from the terminal 440 is $S_{20}/R_{424}$ which is always proportional to the potential of the analog signal $S_{20}$ which in turn is proportional to the engine speed. Accordingly, the output current from the terminal 440 is controlled by the analog signal value $S_{20}$.

Returning to FIG. 14, the charging speed of the capacitor $C_{404}$ is determined by the engine speed and takes the equal advance angle integration wave as illustrated in FIG. 16 as the potential at the terminal 438.

This waveform from the terminal 438 is inputted to a plus input terminal of an operational amplifier $OP_{406}$ to a minus input terminal of which is inputted the signal $S_3$ or $S_4$. The operational amplifier $OP_{406}$ outputs a retard angle signal $S_{24}$ of negative-going pulses whose pulse widths represent the intervals when the signal 438 is at a lower level than the arithmetic circuit output $S_3$, the retard angle signal $S_{24}$ being as shown in FIG. 16. If it is arranged that the equal advance integration waveform at the terminal 438 is saturated at a crank angle of 30°, as shown in FIG. 16, the width of the negative-going pulse of the retard angle signal $S_{24}$ will not exceed a crank angle of 30°. Alternatively, it may be arranged that the retard angle of spark advance is never allowed to exceed 30° even if erroneous operation takes place, thereby preventing stalling of the engine.

The retard angle signal $S_{24}$ and the spark command signal $S_{11}$ are inputted to an AND gate $G_{401}$ which outputs the control signal $S_5$ shown in FIG. 16 defined by the logical product of both input signals. This control signal $S_5$ is fed to the ignition coil 504 through the distributor 502 shown in FIG. 1, thereby causing sparks at respective adjusted time points, and suppressing the occurrence of knocking.

Figure 17:
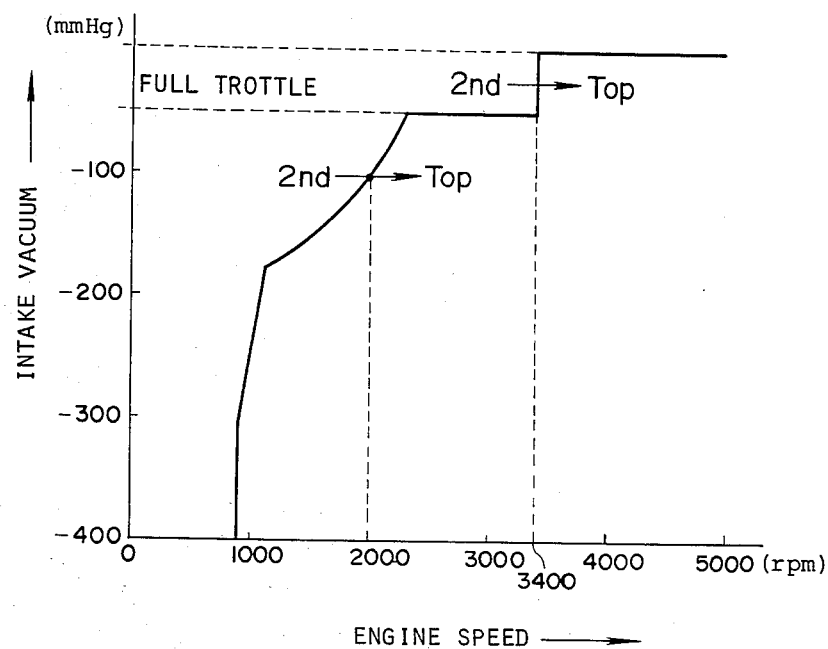
FIG. 17 is a graph showing the variation of intake vacuum in relation to engine speed.
Figure 18:
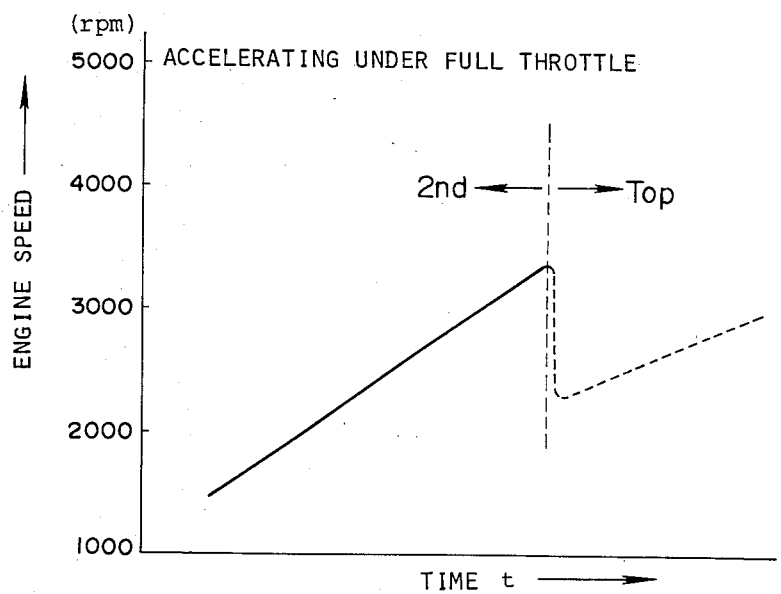
FIG. 18 is a graph showing the variation of engine speed in a condition of full-throttle acceleration.

FIG. 17 shows a relationship between the engine speed and the intake vacuum as an example. As apparent from FIG. 17, the automatic transmission is shifted from second gear to third or top gear at the engine speed 2,000 r.p.m. under partial load condition. Under partial engine load condition, the engine speed 2,000 r.p.m. corresponds to −100 mmHg of intake vacuum. On the other hand, the automatic transmission is shifted from second gear to third or top gear at the engine speed 3,400 r.p.m. under full load conditions. FIG. 18 shows variation of engine speed at the transition condition in which the automatic transmission is shifted from second gear to third or top gear. The example shown in FIG. 18 is a variation of engine speed under full load or full throttle condition. When the transmission gear position is shifted from second gear position to third or top gear position, the engine speed drops from 3,400 r.p.m. to 2,000 r.p.m., abruptly.

Figure 19:
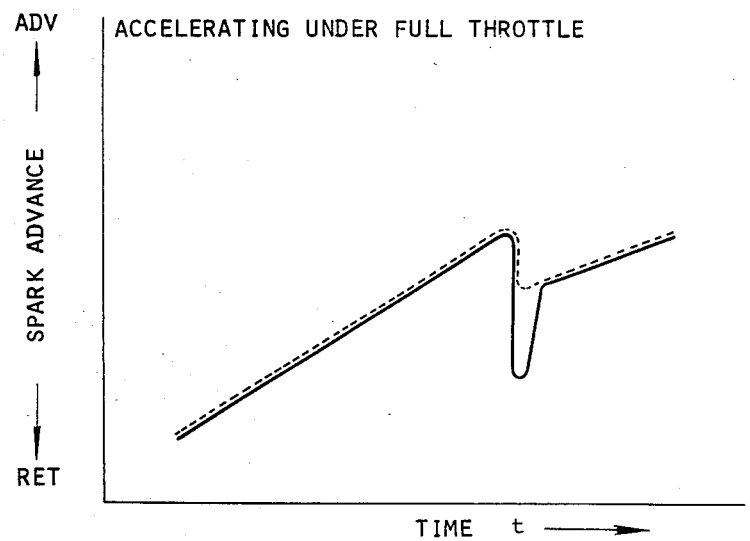
FIG. 19 is a graph showing the variation of spark advance according to full-throttle acceleration of the engine.
Figure 20:
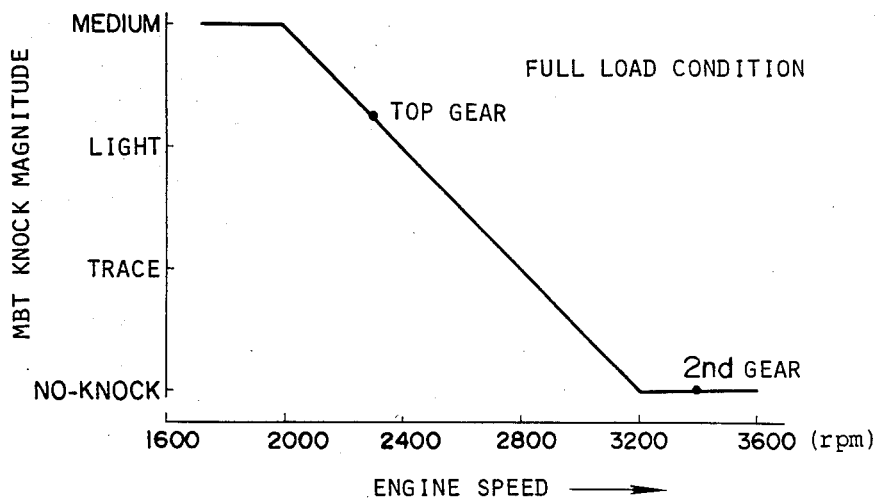
FIG. 20 is a graph showing the magnitude of engine knocking in relation to engine speed and transmission gear position.

FIG. 19 shows the variation of spark ignition timing in response to the shifting of transmission gear position from second gear to top gear. In FIG. 19, the variation characteristic illustrated by the broken line shows the variation of the spark ignition timing under conventional spark ignition control system. On the other hand, the characteristic illustrated by the solid line in FIG. 19 is the improved spark ignition timing in which the spark advance is retard at a controlled value under control of the control system of the present invention. FIG. 20 shows the magnitude of knocking caused in the conventional spark ignition timing control. As seen from FIG. 20, under the conventional control, the magnitude of knocking is increased from a no-knock condition to a light knock condition in response to shifting up from second gear to third gear of the automatic transmission under full load condition.

According to the present invention, increasing of knocking magnitude is prevented by retarding spark advance in response to shifting up of the automatic transmission gear position. Therefore, the invention fulfills the objects and advantages sought therefor.

What is claimed is:

1. A spark ignition timing control system for an internal combustion engine of a vehicle having a transmission comprising:
    an ignition device for causing spark ignition of the engine at a controlled timing;
    a first sensor for detecting engine speed and producing a first sensor signal which has a value proportional to the detected engine speed;
    a second sensor for detecting a knocking condition of the engine and producing a second sensor signal having a value proportional to the magnitude of engine knocking;
    a third sensor for detecting the first sensor signal value indicative of the engine speed at which a shifting-up of a gear position of said transmission occurs and producing a third sensor signal when the transmission gear upshifting first sensor signal value is detected; and
    control means for controlling a spark advance angle of said spark ignition based on the first sensor signal value and second sensor signal value, which control means is responsive to said third sensor signal to retard the spark advance angle.

2. A spark ignition timing control system for an internal combustion engine of a vehicle having an automatic transmission comprising:
    an ignition device for causing spark ignition of the engine at a controlled timing;
    a first sensor for detecting engine speed and producing a first sensor signal which has a value proportional to the detected engine speed;
    a second sensor adapted to detect a knocking condition on the engine and producing a second sensor signal having a value proportional to the magnitude of engine knocking;
    a third sensor adapted to detect an engine speed at which shifting-up of a gear position of said transmission occurs and producing a third sensor signal when the automatic transmission gear upshifting engine speed is detected; and
    control means for controlling a spark advance angle of said spark ignition based on the first sensor signal value and the second sensor signal value, which control means is responsive to said third sensor signal to retard the spark advance angle.

3. A spark ignition timing control system for an internal combustion engine of a vehicle having an automatic transmission, comprising:
    an ignition device for causing spark ignition of the engine at a controlled timing;
    a first sensor for detecting engine speed and producing a first sensor signal which has value proportional to the detected engine speed;
    a second sensor adapted to detect a knocking condition of the engine and producing a second sensor signal having a value proportional to the magnitude of engine knocking;
    a third sensor adapted to produce a third sensor signal indicative of upshifting of a gear position of said transmission, said third sensor including a first detector means responsive to said first signal for detecting when the engine speed reaches a preset engine speed which corresponds to an upshifting point of the transmission, and said third sensor further including a second detector for detecting a load condition on the engine above a preset load value to produce a second detector signal, and a third detector for detecting a full load condition of the engine to produce a third detector signal, said first detector being responsive to first and second preset speeds and producing said third sensor signal when the engine speed is at said first preset speed and said second detector signal is produced, and when the engine speed is at said second preset speed and said third detector signal is produced; and
    control means for controlling a spark advance angle of said spark ignition based on the first sensor signal value and the second sensor signal value, which control means is responsive to said third sensor signal to retard the spark advance angle.

4. A system as set forth in claim 1, 2 or 3, wherein said third sensor further includes a temperature sensor for detecting the engine temperature condition being lower than a predetermined value to produce a temperature sensor signal, and said third sensor being disabled responsive to said temperature sensor signal.

5. A spark ignition timing control system for an internal combustion engine of a vehicle having a transmission, comprising:
    an ignition device for causing spark ignition of the engine at a controlled timing;
    a first sensor for detecting engine speed and producing a first sensor signal which has a value proportional to the detected engine speed;
    a second sensor adapted to detect a knocking condition on the engine and producing a second sensor signal having a value porportional to the magnitude of engine knocking;
    a third sensor adapted to detect shifting-up of the transmission gear position of said vehicle and producing a third sensor signal when the transmission gear upshift is detected, said third sensor including determining means responsive to said first sensor signal for determining when the engine speed reaches a first predetermined speed and a second predetermined speed, said determining means generating said third sensor signal when either one of said first and second predetermined speeds is detected; and
    control means for controlling a spark advance angle of said spark ignition based on the first sensor signal value and second sensor signal value, which control means is responsive to said third sensor signal to retard the spark advance angle.

6. A spark ignition timing control system for an internal combustion engine of a vehicle having an automatic power transmission comprising:
    an ignition device for causing spark ignition of the engine at a controlled timing;
    a first sensor for detecting engine speed and producing a first sensor signal which has a value proportional to the detected engine speed;
    a second sensor adapted to detect a knocking condition in the engine and producing a sensor signal having a value porportional to the magnitude of engine knocking;

a third sensor adapted to detect shifting-up of the transmission gear position of said vehicle and producing a third sensor signal when the transmission gear upshift is detected, said third sensor including determining means responsive to said first signal for determining when engine speed reaches a first predetermined speed and a second predetermined speed, said determining means generating said third sensor signal when either one of said first and second predetermined speeds is detected; and control means for controlling a spark advance angle of said spark ignition device based on the first sensor signal value and second sensor signal value, said control means responsive to said third signal to retard the spark advance angle.

7. A system as set forth in claim 5 or 6, wherein said vehicle has a throttle valve and said third sensor includes a full throttle switch which is turned on when a fully open position of said throttle valve is detected and a vacuum switch which detects intake vacuum in an intake manifold of said engine, said vacuum switch being turned on when the detected intake vacuum exceeds a predetermined value, said determining means generating said third sensor signal when said engine speed is equal to said first predetermined speed and said full throttle switch is one, and generating said third sensor signal when said engine speed is equal to said second predetermined speed and said vacuum switch is turned on.

8. A system as set forth in claim 5 or 6, wherein said third sensor further includes an engine temperature switch which is turned off when the detected engine temperature is below a predetermined value, said temperature switch disabling said third sensor when the detected engine temperature is below the predetermined value.

9. A system as set forth in claim 8, wherein said third sensor further includes a timer responsive to said third sensor signal to turn on for a preset time duration, which preset time duration in said timer defines a predetermined time duration by which said control means retards said spark advance angle.

10. An ignition timing control system for an automotive internal combustion engine comprising:

an automatic power transmission having an upshifting point for shifting-up a transmission gear ratio when an engine speed exceeds a predetermined threshold;

an ignition device for causing spark ignition in the engine at a controlled timing;

a first sensor for detecting an engine speed to produce a first sensor signal having a value proportional to the engine speed;

a second sensor for detecting an engine knocking condition to produce a second sensor signal indicative of a magnitude of engine knocking;

a detector for detecting when said first sensor signal value exceeds said threshold representative of said upshifting point for shifting-up the transmission gear ratio to produce a third signal; and a controller for controlling said ignition device for causing spark ignition at the controlled timing depending upon said first and second sensor signal values, said controller responsive to said third signal to retard a spark advance angle by a given angle.

11. An ignition timing control system for an automotive internal combustion engine comprising:

an automatic power transmission having an upshifting engine speed for shifting-up the gear ratio thereof;

an ignition device for causing spark ignition of the engine at a controlled timing;

a first sensor for detecting an engine speed to produce a first sensor signal having a value proportional to the engine speed;

a second sensor for detecting an engine knocking condition to produce a second sensor signal having a value proportional to a magnitude of the engine knocking;

a detector adapted to detect said first sensor signal value exceeding a predetermined threshold which is indicative of said upshifting engine speed of said automatic power transmission, to output a third signal; and a controller for controlling the timing for causing spark ignition depending upon said first and second sensor signal values, said controller responsive to said third signal for retarding spark advance angle by a given angle.

12. An ignition timing control system for an automotive internal combustion engine comprising:

an automatic power transmission having a gear ratio which shifts up at a first engine speed in full load condition and at a second engine speed in partial load condition in which engine load is above a preset value;

an ignition device for causing spark ignition of the engine at a controlled timing;

a first sensor for detecting engine speed to produce a first signal having a value proportional to the engine speed;

a second sensor for detecting a knocking condition of said engine to produce a second sensor signal having a value proportional to the magnitude of engine knocking;

a detector for detecting said first sensor signal value exceeding a first threshold representative of said first engine speed and detecting said first sensor signal value exceeding a second threshold representative of said second engine speed to produce a third signal; and a controller for controlling spark ignition timing, said controller adjusting a spark advance angle depending upon said first and second sensor signal values and responsive to said third signal for retarding spark advance angle by a given value.

13. An ignition timing control system for an automotive internal combustion engine comprising:

an automatic power transmission having an upshifting point for shifting-up a transmission gear ratio when an engine speed exceeds a predetermined threshold which is variable depending upon a load condition on the engine;

an ignition device for causing spark ignition in the engine at a controlled timing;

a first sensor for detecting an engine speed to produce a first sensor signal having a value proportional to the engine speed;

a second sensor for detecting an engine knocking condition to produce a second sensor signal indicative of a magnitude of engine knocking;

a detector for detecting when said first sensor signal value exceeds said threshold representative of said upshifting point for shifting-up the transmission gear ratio to produce a third signal;

a controller for controlling said ignition device for causing spark ignition at the controlled timing depending upon said first and second sensor signal values, said controller responsive to said third signal to retard a spark advance angle by a given amount.

14. An ignition timing control system for an automotive internal combustion engine comprising:
   an automatic power transmission having an upshifting point for shifting-up a transmission gear ratio depending upon an engine speed;
   an ignition device for causing spark ignition in the engine at a controlled timing;
   a first sensor for detecting engine speed to produce a first sensor signal having a value indicative of the engine speed;
   a second sensor for detecting a knocking condition of the engine to produce a second sensor signal indicative of the magnitude of engine knocking;
   a third sensor for detecting a load condition on the engine to produce a third sensor signal having a value indicative of the engine load;
   means for producing a fourth signal when said first sensor signal value becomes equal to or exceeds a given threshold, said fourth signal producing means being responsive to said third signal to vary said threshold value depending upon the third signal value; and
   a controller for controlling said ignition device for causing spark ignition at the controlled timing depending upon said first and second sensor signal values, said controller responsive to said fourth signal to retard a spark advance angle by a given amount.

15. An ignition timing control system for an automotive internal combustion engine comprising:
   an automatic power transmission having an upshifting point for shifting-up a transmission gear ratio when an engine speed becomes higher than a given value;
   an ignition device for causing spark ignition in the engine at a controlled timing;
   a first sensor for detecting an engine speed to produce a first sensor signal having a value indicative of the engine speed;
   a second sensor for detecting a knocking condition of the engine to produce a second sensor signal indicative of a magnitude of the engine knocking;
   a third sensor for detecting a load condition on the engine to produce a third sensor signal having a value indicative of the engine load;
   means for detecting a shifting-up point of said power transmission based on said first and third signal values for producing a fourth signal when the first signal value corresponding to the transmission gear shifting-up point is detected; and
   a controller for controlling said ignition device for effecting spark ignition in the engine at the controlled timing dependent upon said first and second signal values, said controller responsive to said fourth signal to retard a spark advance angle at a given rate.

16. An ignition timing control system for an automotive internal combustion engine comprising:
   an automatic power transmission having an upshifting point for shifting-up a transmission gear ratio depending upon engine speed;
   an ignition device for causing spark ignition in the engine at a controlled timing;
   a first sensor for detecting engine speed to produce a first sensor signal having a value indicative of the engine speed;
   a second sensor for detecting a knocking condition on the engine to produce a second sensor signal representative of magnitude of the engine knocking;
   a third sensor for detecting an angular position of a throttle valve to produce a third sensor signal representative of the throttle valve angle position;
   means for detecting the engine speed at said upshifting point of said power transmission based on said first and third sensor signal values, said upshifting engine speed detecting means producing a fourth signal when the first sensor signal value corresponding to the engine speed at the transmission gear upshifting point is detected;
   a controller for controlling said ignition device for effecting spark ignition in the engine at the controlled timing dependent upon said first and second sensor signal values, said controller responsive to said fourth signal to retard spark advance angle by a given amount.

* * * * *